US009475461B1

(12) United States Patent
Pudiyathanda et al.

(10) Patent No.: US 9,475,461 B1

(45) Date of Patent: Oct. 25, 2016

(54) SILENT HORN-SIGNAL WITH SENDER LOCATION

(71) Applicant: DELPHI TECHNOLOGIES, INC., Troy, MI (US)

(72) Inventors: Devaiah A. Pudiyathanda, JP Nagar 8th Place (IN); Pavithra Vempalli Narayana, Bangalore (IN); Sowmya Katikala, Bangalore (IN); Rashmi Ramachandra, Hassan (IN)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/751,413

(22) Filed: Jun. 26, 2015

(51) Int. Cl.

| | |
|---|---|
| ***G08G 1/00*** | (2006.01) |
| ***B60R 25/102*** | (2013.01) |
| ***B60R 25/104*** | (2013.01) |
| *B60R 25/10* | (2013.01) |

(52) U.S. Cl.

CPC ........... *B60R 25/102* (2013.01); *B60R 25/104* (2013.01); *B60R 2025/1016* (2013.01)

(58) Field of Classification Search

CPC .............. B60R 25/102; B60R 25/104; B60R 2025/1016

USPC ............ 340/902, 933, 903, 905, 425.5, 906, 340/435, 572.1, 384.1, 573.1; 701/300, 301

See application file for complete search history.

(56) References Cited

U.S. PATENT DOCUMENTS

2015/0002313 A1* 1/2015 Caskey ................ G08G 1/0965 340/902
2015/0042491 A1* 2/2015 Burnison ................ B60Q 1/52 340/902
2015/0348413 A1* 12/2015 Han ....................... G08G 1/166 340/933

FOREIGN PATENT DOCUMENTS

IN 2012CH00899 A 9/2013
KR WO 2014077441 A1 * 5/2014 ............ G08G 1/161

* cited by examiner

*Primary Examiner* — Dhaval Patel

(74) *Attorney, Agent, or Firm* — Lawrence D. Hazelton

(57) ABSTRACT

A system for silently communicating a horn-signal between vehicles is provided. The system includes a sending-vehicle equipped with a horn-button operable by a horn-operator, a transmitter configured to transmit, using electromagnetic-energy, a horn-signal in response to the horn-operator operating the horn-button, and a first location-device configured to determine a send-location of the sending-vehicle. The transmitter is configured to incorporate the send-location into the horn-signal. The system may also include a receiving-vehicle different from the sending-vehicle. The receiving-vehicle is equipped with a receiver configured to detect the horn-signal, and a second location-device configured to determine, based on the horn-signal, a relative-location of the sending-vehicle relative to the receiving-vehicle.

13 Claims, 4 Drawing Sheets

SILENT HORN-SIGNAL WITH SENDER LOCATION

TECHNICAL FIELD OF INVENTION

This disclosure generally relates to a system for silently communicating a horn-signal from one vehicle to another vehicle, and more particularly relates to a transmitter configured to transmit a horn-signal that includes or incorporates a send-location of the sending-vehicle into the horn-signal.

BACKGROUND OF INVENTION

It is known that the honking of vehicle-horns by vehicle-operators undesirably adds to noise pollution, especially in urban environments. Public education campaigns have been initiated in some countries in an attempt to reduce this noise pollution.

SUMMARY OF THE INVENTION

In accordance with one embodiment, a system for silently communicating a horn-signal between vehicles is provided. The system includes a sending-vehicle equipped with a horn-button operable by a horn-operator, a transmitter configured to transmit, using electromagnetic-energy, a horn-signal in response to the horn-operator operating the horn-button, and a first location-device configured to determine a send-location of the sending-vehicle. The transmitter is configured to incorporate the send-location into the horn-signal.

In accordance with another embodiment, the system includes a receiving-vehicle different from the sending-vehicle. The receiving-vehicle is equipped with a receiver configured to detect the horn-signal, and a second location-device configured to determine, based on the horn-signal, a relative-location of the sending-vehicle relative to the receiving-vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
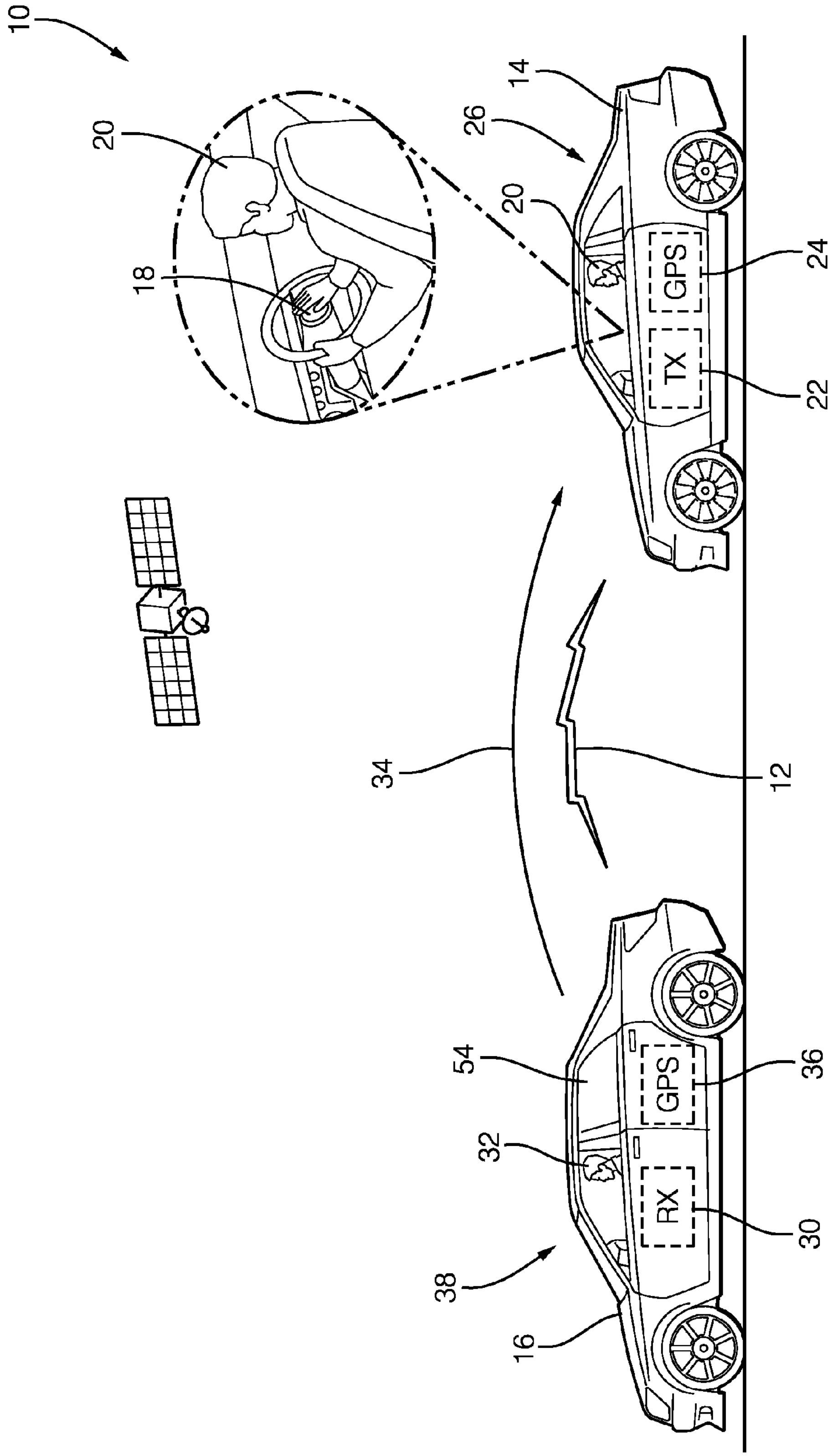
FIG. 1 is a side view of a vehicle equipped with a system for silently communicating a horn-signal between vehicles in accordance with one embodiment.

FIG. 1 illustrates a non-limiting example of a system 10 for silently communicating a horn-signal 12 between vehicles such as automobiles, trucks, motorcycles, etc. In this non-limiting example, the vehicles are a sending-vehicle 14 which transmits the horn-signal 12, and a receiving-vehicle 16 which receives or detects the horn-signal 12. In order for the horn-signal 12 to be silently communicated between vehicles, the horn-signal is transmitted using electromagnetic-energy such as infrared-light (IR) energy or radio-frequency (RF) energy. That is, the horn-signal 12 is characterized as being silent because a human-being cannot hear directly with ears the electromagnetic-energy. In other words, the horn-signal 12 is not acoustic in nature so cannot be directly heard by human-beings without some intervening apparatus, e.g. an RF receiver. By using electromagnetic-energy to transmit the horn-signal 12, the problem of noised pollution caused by the operation of acoustic horns on vehicles is solved. The fundamental frequency of the electromagnetic-energy used to transmit the horn-signal 12 may be selected based on desired transmission distance and resistance to being obstructed by expected objects present between the sending-vehicle 14 and the receiving-vehicle 16.

The sending-vehicle 14 is equipped with a horn-button 18 operable by a horn-operator 20, i.e. the operator of the sending-vehicle 14. The horn-button 18 is illustrated as being located on a steering wheel of an automobile. However, other locations are possible, and the horn-button 18 is preferably distinct from whatever deices is provided to operate a traditional acoustic horn if the sending-vehicle is so equipped. While only the horn-button 18 for initiating the transmission of the horn-signal 12 is illustrated, it is contemplated that the sending-vehicle 14 would also be equipped with an acoustic horn operated by a separate switch or push-button so that, for example, a pedestrian can be warned of the approach of the sending-vehicle 14.

The sending-vehicle 14 is also equipped with a transmitter 22 (TX) configured to transmit the horn-signal 12 using electromagnetic-energy. That is, as noted above, the horn-signal 12 is not comparable to the audible horn sound emitted by a traditional horn. The transmitter 22 transmits the horn-signal 12 in response to the horn-operator 20 operating the horn-button 18. The sending-vehicle 14 is also equipped with a first location-device 24 such as a global-positioning-sensor (GPS), or other navigation device known to those in the art. The first location-device 24 is configured to determine a send-location 26 of the sending-vehicle 14. So that the send-location 26 of the sending-vehicle 14 can be determined by the receiving-vehicle 16, as will be described in more detail below, the transmitter 22 is configured to incorporate the send-location 26 into the horn-signal 12. As used herein, to incorporate the send-location 26 into the horn-signal 12 means that the information represented by the send-location 26 is modulated or mixed or otherwise embedded into the horn-signal 12, the various techniques for doing so will be readily recognized by those in the art.

The receiving-vehicle 16, which is understood to be different or distinct from the sending-vehicle 14, is equipped with a receiver 30 configured to detect the horn-signal 12. The receiving-vehicle 16 is advantageously configured to indicate to an operator 32 of the receiving-vehicle 16 a relative-location 34 so the operator 32 can determine who is sending the horn-signal 12. As used herein, the relative-location 34 means the location of the sending-vehicle 14 relative to the receiving-vehicle 16. The advantage of knowing who or which vehicle sent the horn-signal 12 is helpful for the operator 32 to understand what the horn-operator 20 is attempting to communicate by sending the horn-signal 12. For example, if the horn-operator 20 is about to pass the operator 32, i.e. the sending-vehicle 14 is about to pass the receiving-vehicle 16, the horn-signal 12 is sent so the operator 32 is not surprised when passed. In another scenario not illustrated, if the receiving-vehicle is about to enter (i.e. turn onto) a travel-lane occupied or traveled by the sending-vehicle, and the view of the operator of the receiving-vehicle is blocked by a building or vegetation, a horn-signal may be sent as a warning to the operator that he/she should not proceed.

In order to determine the relative-location 34, the receiving-vehicle 16 may be equipped with a second location-device 36 configured to determine a receive-location 38. Based on the horn-signal 12 that includes the send-location 26 and the receive-location 38, the relative-location 34 of the sending-vehicle 14 relative to the receiving-vehicle 16 can be determined. The relative-location 34 may include a distance 40 and/or a direction 42 (FIG. 2) and/or an elevation difference. The relative-location 34 may be communicated to the operator 32 by, but not limited to, visual means and/or audible means as will be explained in more detail below.

Figure 2:
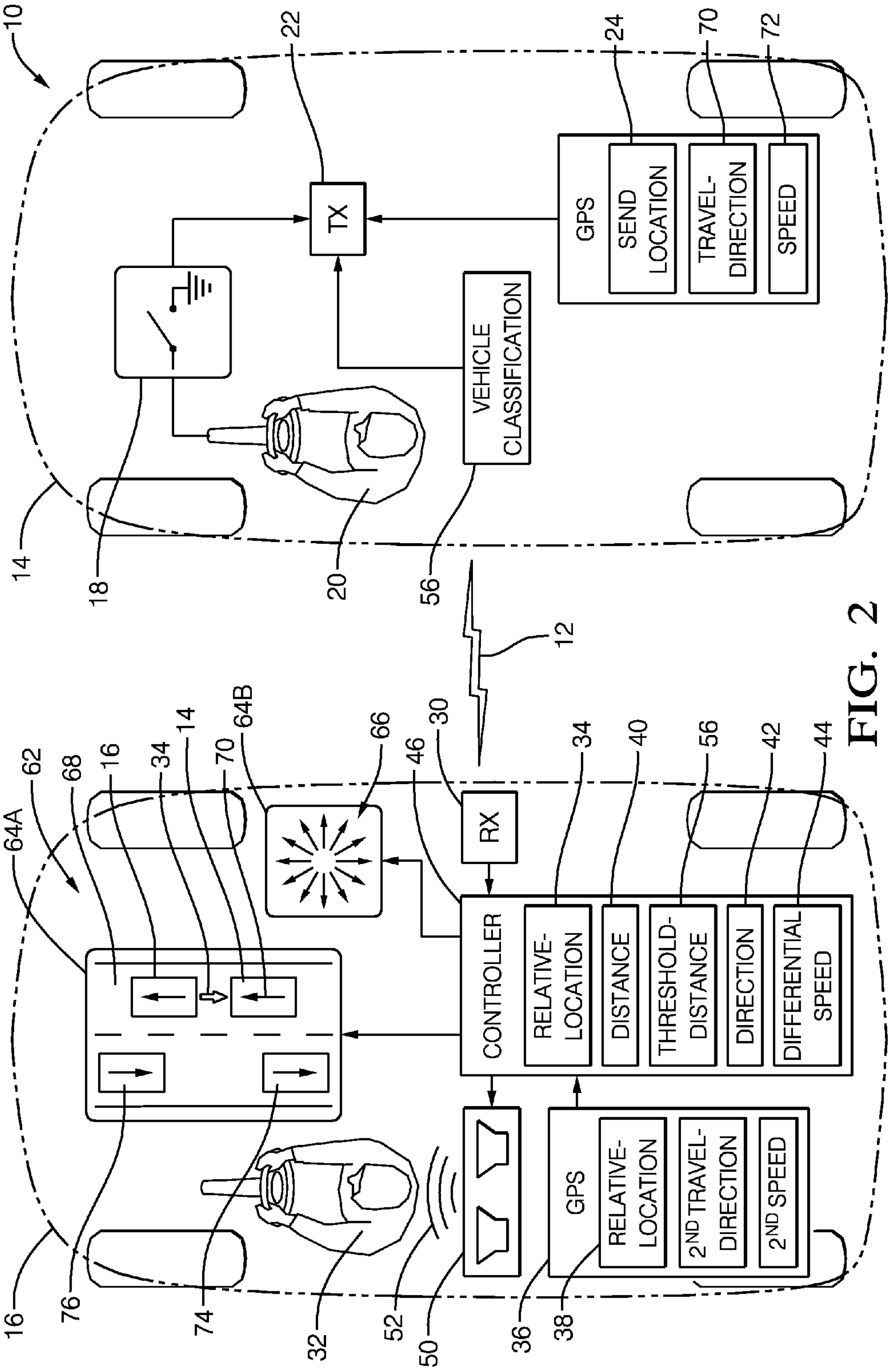
FIG. 2 is a diagram of the system of FIG. 1 in accordance with one embodiment.

FIG. 2 further illustrates non-limit details of the system 10. The receiving-vehicle 16 may also be equipped with a controller 46 configured to receive signals from the receiver 30 and the second location-device 36. The controller 46 may include a processor (not shown) such as a microprocessor or other control circuitry such as analog and/or digital control circuitry including an application specific integrated circuit (ASIC) for processing data as should be evident to those in the art. The controller 46 may include memory (not shown), including non-volatile memory, such as electrically erasable programmable read-only memory (EEPROM) for storing one or more routines, thresholds and captured data. The one or more routines may be executed by the processor to perform steps for determining or evaluating signals received by the controller 46, e.g. for communicating information about the horn-signal 12 to the operator 32 as described herein.

The receiving-vehicle 16 may include a speaker-arrangement 50 configured to emit sound 52 into a cabin 54 (FIG. 1) of the receiving-vehicle 16 in response to the receiver 30 detecting the horn-signal 12. The illustration in FIG. 2 suggests that the speaker-arrangement 50 consists of four speakers; however vehicles with more or fewer than four speakers are contemplated. Furthermore, the speaker-arrangement is not limited to using only relatively high-fidelity speakers that are also used by an entertainment system in the receiving-vehicle 16 for emitting music. A speaker-arrangement of lower-fidelity sound emitters is contemplated which can economically provide for more than four sources of sound within the cabin 54, and thereby more easily convey, for example, a direction to the sending-vehicle 14 as will be explained in more detail below.

It is contemplated that the sending-vehicle 14 would also be equipped with some sort of speaker or sound emitter configured to emit sound into the cabin of the sending-vehicle 14 so that the horn-operator 20 was well-aware that the horn-signal 12 was being transmitted. Equipping/configuring the sending-vehicle 14 in this manner may help to avoid unnecessary or inadvertent activation of the horn-button 18 by the horn-operator 20, e.g. the horn-operator merely holding the horn-button 18 in an 'activated' position. It is also contemplated that the transmitter 22 may have a time-out function that causes the transmitter 22 to stop transmitting the horn-signal 12 if the horn-button 18 is continuously activated for more than some predetermined time interval, 5 seconds for example.

Figure 3:
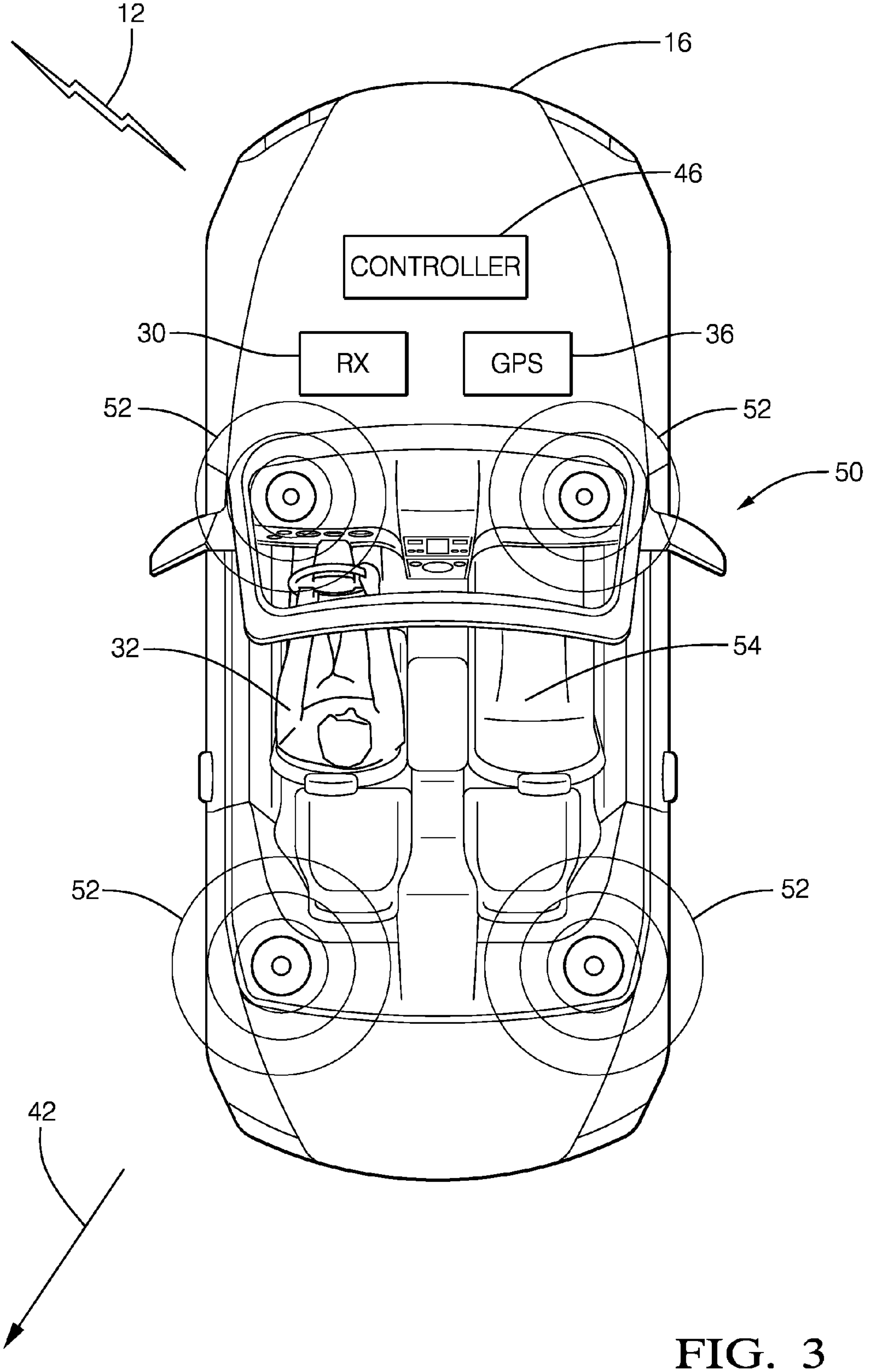
FIG. 3 is top cut-away view of a vehicle equipped with the system of FIG. 1 in accordance with one embodiment.

FIG. 3 further illustrates non-limiting details about the receiving-vehicle 16. In this example, the receiving-vehicle 16 is equipped with a speaker-arrangement 50 that has eight speakers. Some of the speakers are larger and therefor better configured for reproducing lower frequencies of audible sound, and some of the speakers are smaller and therefor better configured for reproducing higher frequencies of audible sound, as will be recognized by those in the art. While the illustration suggests that only four of the eight speakers are used to emit the sound 52 indicative of the horn-signal 12 being received by the receiver 30, this is not a limitation of the system. That is, more or less than four of the eight speakers may be used to emit the sound 52 to the operator 32.

In one embodiment of the system 10, the receiving-vehicle 16, or more specifically the controller 46, may be configured such that the sound 52 is not emitted by the speaker-arrangement 50 when the sending-vehicle 14 is a distance 40 (FIG. 2) away from the receiving-vehicle 16 greater than a threshold-distance 56 (FIG. 2). That is, if the sending-vehicle 14 is far away, the fact that the sending-vehicle 14 is transmitting the horn-signal 12 may not be relevant to the operation of the receiving-vehicle 16, so the sound 52 is not unnecessarily emitted to the operator 32.

In another embodiment of the system 10, the sending-vehicle 14 may be characterized by a vehicle-classification 56 (FIG. 2) such as, but not limited to, a motorcycle, an automobile, a small-truck, a large-truck, a fire-truck, or an ambulance. The transmitter 22 may then be configured to incorporate the vehicle-classification 56 into the horn-signal 12 in a manner similar to that used to incorporate the send-location 26 into the horn-signal 12. Then the receiving-vehicle 16 and/or the controller 46 may be configured so the sound 52 output by the speaker-arrangement 50 corresponds to the vehicle-classification 56. For example, if the sending-vehicle 14 is a motorcycle, the sound 52 may be a higher-pitch beep sound that a human-being would readily associate with a motorcycle when compared to a lower-pitch honk sound that a human-being would readily associate with a large truck. Alternatively, the horn-signal 12 may include an audio-waveform that corresponds to the desired sound of a horn that will be emitted by the speaker-arrangement 50.

In another embodiment, the receiving-vehicle 16 and/or the controller 46 may be configured such that the sound 52 is indicative to the operator 32 of the direction 42 from the receiving-vehicle 16 to the sending-vehicle 14. For example, if the sending-vehicle 14 is behind and to the left of the receiving-vehicle 16 as indicated by the direction 42 in FIG. 3, the level or volume of the sound 52 from the back-left speaker may be louder than the sound 52 emitted by the other speakers in the speaker-arrangement 50 to indicate the direction 42 to the operator 32. Other special effects may be combined with this differential volume to further help the operator 32 determine the direction 42 based on the sound 52 such as altering the relative phase/delay and/or tone-equalization and/or echo applied to the sound 52 emitted by each speaker. Such special effects are known to those in the surround-sound entertainment arts. It is also contemplated that speakers could be positioned above and below the operator 32 so that an elevation difference could be conveyed to the operator 32.

Figure 4:
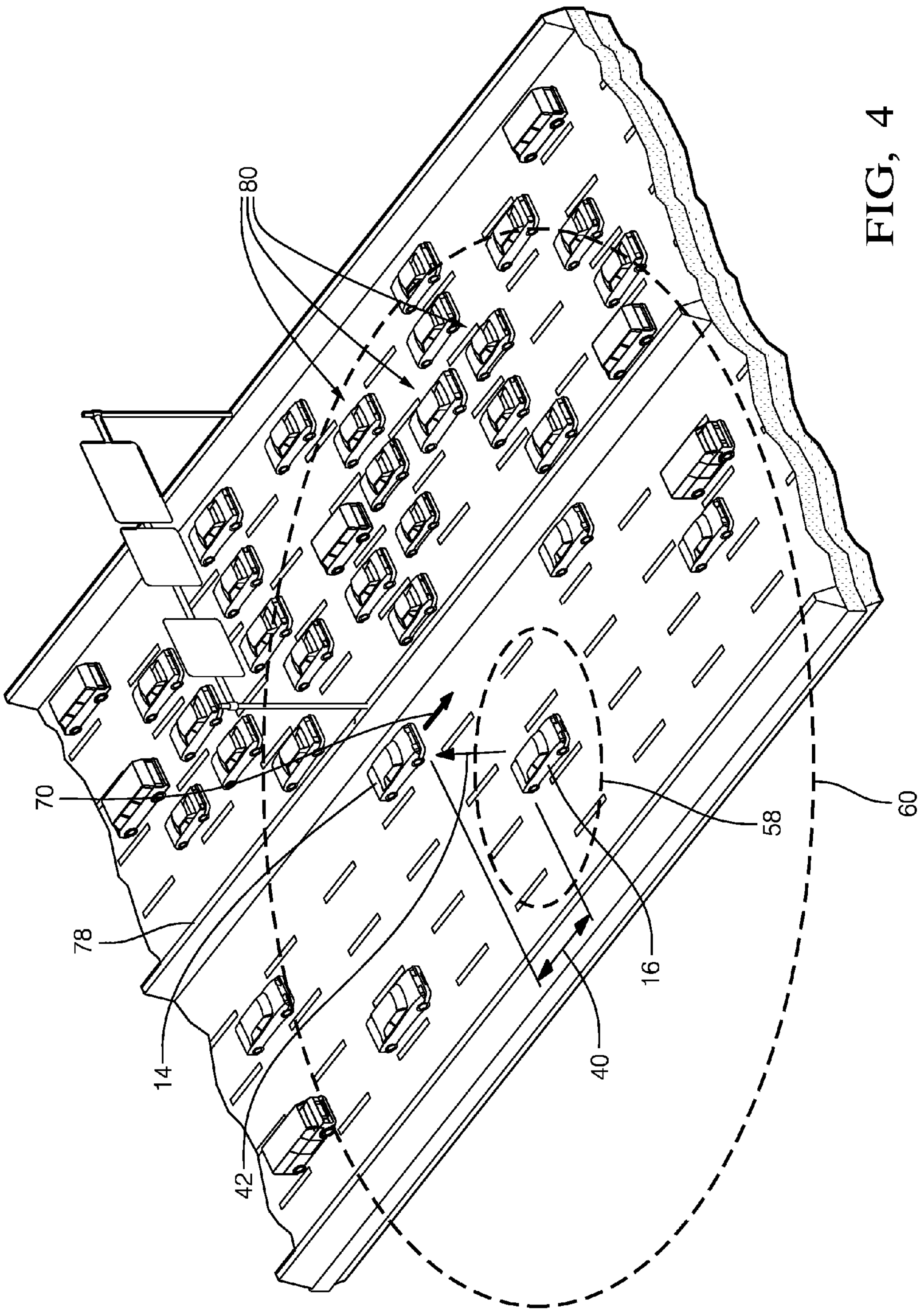
FIG. 4 is a traffic scenario experienced by a vehicle equipped with the system of FIG. 1 in accordance with one embodiment.

FIG. 4 illustrates a non-limiting example of a traffic scenario that the sending-vehicle 14 and the receiving-vehicle 16 may encounter, where the direction 42 is also indicated. In another embodiment, the receiving-vehicle 16 and/or the controller 46 may be configured such that the sound 52 (FIGS. 2 and 3) is indicative to the operator 32 of the distance 40 from the receiving-vehicle 16 to the sending-vehicle 14. For example, the sound 52 may be emitted by the speaker-arrangement 50 at: a loud-volume when the vehicle transmitting a horn-signal 12 is inside the inner-ring 58; a soft-volume when the vehicle transmitting a horn-signal 12 is between the inner-ring 58 and an outer-ring 60; and no-volume (i.e. no sound is emitted) when the vehicle transmitting a horn-signal 12 is outside the outer-ring 60. In FIG. 4 the sending-vehicle is between the inner-ring 58 and an outer-ring 60 so the sound 52 emitted by the speaker-arrangement 50 will have a relatively soft-volume. Alternatively, the volume of the sound 52 may be varied continuously as a function of distance.

It is contemplated that the sound 52 may be indicative to the operator 32 of both the distance 40 and the direction 42 from the receiving-vehicle 16 to the sending-vehicle 14 where, for example, a combination of total volume output by the speaker-arrangement 50 indicates the distance 40, and differential volume from speaker to speaker is used to indicate the direction 42.

As an alternative to or in combination with the speaker-arrangement 50, the receiving-vehicle 16 may include a visual-indicator 62 configured to visually indicate the relative-location 34 to the operator 32 of the receiving-vehicle 16. That is, the receiving-vehicle 16 is configured so the operator 32 can see the indication of the relative-location 34 via the visual-indicator 62 rather than hear the indication via the speaker-arrangement 50. By way of example and not limitation, the visual-indicator 62 may be a reconfigurable-display 64A such as what is commonly found in vehicles for navigation devices or entertainment system displays. The reconfigurable-display 64A shown in this example shows a roadway or a travel-lane 68 traveled by the receiving-vehicle 16 and the sending-vehicle 14. The relative-location 34 may be further indicated by an arrow as illustrated. The relative-location 34 may be made apparent to the operator 32 by showing the image or depiction of the sending-vehicle 14 in a contrasting color or as highlighted. By way of further example, the visual-indicator 62 may be a more dedicated type of visual indicator such as a display-device 64B that, for example, illuminates one of a plurality of arrows 66 to indicate the direction 42, where the illumination intensity indicates distance 40 (closer=brighter) such that the relative-location 34 is indicated by the combination of direction and distance. Accordingly, the visual-indicator 62, either the reconfigurable-display 64A and/or the display-device 64B may be provided to the direction 42 and/or the distance 40 from the receiving-vehicle 16 to the sending-vehicle 14.

In another embodiment of the system 10, the sending-vehicle 14 may be characterized by a travel-direction 70 of the sending-vehicle 14. As with the send-location 26, the transmitter 22 may be configured to incorporate the travel-direction 70 into the horn-signal 12. Then the receiving-vehicle 16 may be configured so the visual-indicator 62 indicates the travel-direction 70 to the operator 32. For example, as illustrated in FIG. 2, an arrow overlying the depiction of the sending-vehicle 14 serves to indicate the travel-direction 70. Similarly, the sending-vehicle 14 may be characterized by a speed 72 of the sending-vehicle 14, and the transmitter 22 may be configured to incorporate the speed 72 into the horn-signal 12. The speed 72 may be indicated to the operator 32 by, for example, the length of the arrow used to indicate the travel-direction 70, where a longer arrow indicates a higher speed.

It is also contemplated that the area about the receiving-vehicle 16 that is shown on the reconfigurable-display 64A may not include the sending-vehicle 14 because, for example, the sending-vehicle 14 is far away or is traveling fast towards the receiving-vehicle 16. It is contemplated that the reconfigurable-display 64A may zoom-out and/or pan as necessary to include the sending-vehicle 14 on the reconfigurable-display 64A As suggested above, a sending-vehicle may be characterized by a travel-direction, and the transmitter in the sending-vehicle may be configured to incorporate the travel-direction into the horn-signal. If the travel-direction of a vehicle is opposite that of the receiving-vehicle 16, and the relative-location 34 indicates that the sending-vehicle is behind the receiving-vehicle 16, then the receiving-vehicle 16 may be configured to ignore the horn-signal 12. For example, as shown in the illustration of the reconfigurable display 64A in FIG. 2, a second-vehicle 74 is shown traveling in the opposite direction as the receiving-vehicle 16. If the second-vehicle 74 transmits a horn-signal, the receiving-vehicle 16 may safely ignore the horn-signal because it is likely not relevant to the travel path of the receiving-vehicle. However if the third-vehicle 76 transmits a horn-signal, even though it is traveling in a direction opposite of the receiving-vehicle 16, the horn-signal may be relevant to the safe operation of the receiving-vehicle 16 so is not ignored.

Alternatively, as suggested above, a sending-vehicle may be characterized by a travel-direction, the transmitter in the sending-vehicle may be configured to incorporate the travel-direction into the horn-signal, and the receiving-vehicle 16 may be configured to ignore the horn-signal in certain situations. Referring again to FIG. 4, the roadway on which the receiving-vehicle 16 travels may include a roadway-barrier 78 that separates traffic traveling in one direction from traffic traveling in the opposite direction. A horn-signal may be safely ignored by the receiving-vehicle 16 if the horn-signal is emitted by any of the other-vehicles 80 that make up the from on-coming traffic traveling in the opposite direction as the receiving-vehicle 16, and the other-vehicles 80 are separated or isolated from the receiving-vehicle 16 by is the roadway-barrier 78. That is, the receiving-vehicle 16 may be configured to ignore the horn-signal when the travel-direction of the vehicle transmitting the horn-signal is opposite that of the receiving-vehicle 16, and there is a roadway-barrier 78 between the sending-vehicle and the receiving-vehicle 16.

Accordingly, a system 10 for silently communicating a horn-signal 12 between vehicles is provided. The horn-signal 12 is transmitted using electromagnetic energy, so the horn-signal 12 does not undesirably contribute to noise pollution. Information such as the send-location 26 from where the horn-signal 12 is sent can be incorporated into the horn-signal 12 so the operator 32 of the receiving-vehicle 16 can determine the origin of the horn-signal.

While this invention has been described in terms of the preferred embodiments thereof, it is not intended to be so limited, but rather only to the extent set forth in the claims that follow.

We claim:

1. A system for silently communicating a horn-signal between vehicles, said system comprising:

a sending-vehicle equipped with a horn-button operable by a horn-operator, a transmitter configured to transmit, using electromagnetic-energy, a horn-signal in response to the horn-operator operating the horn-button, and a first location-device configured to determine a send-location of the sending-vehicle, wherein the transmitter is configured to incorporate the send-location into the horn-signal, wherein the system includes a receiving-vehicle different from the sending-vehicle, said receiving-vehicle equipped with a receiver configured to detect the horn-signal, and a second location-device configured to determine, based on the horn-signal, a relative-location of the sending-vehicle relative to the receiving-vehicle, wherein the receiving-vehicle includes a speaker-arrangement configured to emit sound into a cabin of the receiving-vehicle in response to the receiver detecting the horn-signal, wherein the sending-vehicle is characterized by a vehicle-classification, the transmitter is configured to incorporate the vehicle-classification into the horn-signal, and the receiving-vehicle is configured so the sound output by the speaker-arrangement corresponds to the vehicle-classification.

2. The system in accordance with claim 1, wherein the electromagnetic-energy is one of infrared-light (IR) energy and radio-frequency (RF) energy.

3. The system in accordance with claim 1, wherein the receiving-vehicle is configured such that sound is not emitted by the speaker-arrangement when the sending-vehicle is a distance away from the receiving-vehicle greater than a threshold-distance.

4. The system in accordance with claim 1, wherein the vehicle-classification includes motorcycle, automobile, small-truck, large-truck, fire-truck, and ambulance.

5. The system in accordance with claim 1, wherein the sound is indicative to an operator of a direction from the receiving-vehicle to the sending-vehicle.

6. The system in accordance with claim 1, wherein the sound is indicative to an operator of a distance from the receiving-vehicle to the sending-vehicle.

7. The system in accordance with claim 1, wherein the sound is indicative to an operator of a distance and a direction from the receiving-vehicle to the sending-vehicle.

8. A system for silently communicating a horn-signal between vehicles, said system comprising:

a sending-vehicle equipped with a horn-button operable by a horn-operator, a transmitter configured to transmit, using electromagnetic-energy, a horn-signal in response to the horn-operator operating the horn-button, and a first location-device configured to determine a send-location of the sending-vehicle, wherein the transmitter is configured to incorporate the send-location into the horn-signal, wherein the system includes a receiving-vehicle different from the sending-vehicle, said receiving-vehicle equipped with a receiver configured to detect the horn-signal, and a second location-device configured to determine, based on the horn-signal, a relative-location of the sending-vehicle relative to the receiving-vehicle, wherein the receiving-vehicle includes a visual-indicator configured to indicate the relative-location to an operator of the receiving-vehicle, wherein the sending-vehicle is characterized by a travel-direction, the transmitter is configured to incorporate the travel-direction into the horn-signal, and the receiving-vehicle is configured so the visual-indicator indicates the travel-direction.

9. The system in accordance with claim 8, wherein the visual-indicator indicates a direction from the receiving-vehicle to the sending-vehicle.

10. The system in accordance with claim 8, wherein the visual-indicator indicates a distance from the receiving-vehicle to the sending-vehicle.

11. The system in accordance with claim 8, wherein the visual-indicator indicates a distance and a direction from the receiving-vehicle to the sending-vehicle.

12. A system for silently communicating a horn-signal between vehicles, said system comprising:

a sending-vehicle equipped with a horn-button operable by a horn-operator, a transmitter configured to transmit, using electromagnetic-energy, a horn-signal in response to the horn-operator operating the horn-button, and a first location-device configured to determine a send-location of the sending-vehicle, wherein the transmitter is configured to incorporate the send-location into the horn-signal, wherein the system includes a receiving-vehicle different from the sending-vehicle, said receiving-vehicle equipped with a receiver configured to detect the horn-signal, and a second location-device configured to determine, based on the horn-signal, a relative-location of the sending-vehicle relative to the receiving-vehicle, wherein the sending-vehicle is characterized by a travel-direction, the transmitter is configured to incorporate the travel-direction into the horn-signal, and the receiving-vehicle is configured to ignore the horn-signal when the travel-direction is opposite that of the receiving-vehicle, and the relative-location indicates that the sending-vehicle is behind the receiving-vehicle.

13. A system for silently communicating a horn-signal between vehicles, said system comprising:

a sending-vehicle equipped with a horn-button operable by a horn-operator, a transmitter configured to transmit, using electromagnetic-energy, a horn-signal in response to the horn-operator operating the horn-button, and a first location-device configured to determine a send-location of the sending-vehicle, wherein the transmitter is configured to incorporate the send-location into the horn-signal, wherein the system includes a receiving-vehicle different from the sending-vehicle, said receiving-vehicle equipped with a receiver configured to detect the horn-signal, and a second location-device configured to determine, based on the horn-signal, a relative-location of the sending-vehicle relative to the receiving-vehicle, wherein the sending-vehicle is characterized by a travel-direction, the transmitter is configured to incorporate the travel-direction into the horn-signal, and the receiving-vehicle is configured to ignore the horn-signal when the travel-direction is opposite that of the receiving-vehicle, and there is a roadway-barrier between the sending-vehicle and the receiving-vehicle.

* * * * *